(No Model.)  7 Sheets—Sheet 1.

A. S. KROTZ.
ELECTRIC CONVEYING SYSTEM.

No. 603,606.  Patented May 3, 1898.

Witnesses
Chas. E. Riordan
John H. Hazelton

Inventor
Alvaro S. Krotz
By Julian A. Dowell
His Attorney

(No Model.)

A. S. KROTZ.
ELECTRIC CONVEYING SYSTEM.

No. 603,606.

Patented May 3, 1898.

(No Model.) 7 Sheets—Sheet 4.

A. S. KROTZ.
ELECTRIC CONVEYING SYSTEM.

No. 603,606. Patented May 3, 1898.

(No Model.)

A. S. KROTZ.
ELECTRIC CONVEYING SYSTEM.

Patented May 3, 1898.

Fig. 7.

WITNESSES:
Chas. E. Riordan

INVENTOR
Alvaro S. Krotz
BY
HIS ATTORNEY.

UNITED STATES PATENT OFFICE.

ALVARO SILAS KROTZ, OF SPRINGFIELD, OHIO, ASSIGNOR TO OLIVER S. KEILY, OF SAME PLACE.

ELECTRIC CONVEYING SYSTEM.

SPECIFICATION forming part of Letters Patent No. 603,606, dated May 3, 1898.

Application filed December 2, 1897. Serial No. 660,541. (No model.)

*To all whom it may concern:*

Be it known that I, ALVARO SILAS KROTZ, a citizen of the United States, residing at Springfield, in the county of Clark and State of Ohio, have invented certain new and useful Improvements in Electric Conveying Systems; and I do hereby declare the following to be a full, clear, and exact description of the invention, such as will enable others skilled in the art to which it appertains to make and use the same.

This invention relates to conveying systems, and although capable of embodiment in a multitude of ways in various connections it is particularly adapted for use in store-service apparatus for conveying parcels from place to place, as from the counter where the salesman is located to the cashier's stand, where the goods are wrapped and change is made, the money for the goods being transmitted to the cashier's stand with the parcel.

I have said that the invention is particularly adapted for use in store-service apparatus because I have found this to be the case in actual practice; but I contemplate its employment in many other connections, and hence do not desire to limit myself in any way to the embodiment of the invention in any one form of apparatus or for any one particular purpose.

The invention involves the employment of electricity in the operation of the system and instrumentalities whereby automatic transfer of the parcels or other load to be carried is effected, and the invention is intended largely as an improvement upon certain prior constructions of store-service apparatus, and particularly those illustrated in Patents No. 544,002, dated August 6, 1895, and No. 578,939, dated March 16, 1897, both granted to H. M. Neer. These patents disclose the general idea of a store-service apparatus in which a conveyer is caused to traverse a track by electricity and to pick up receptacles or carriers at various points or stations along the track and to leave such receptacles at their proper stations after having been delivered at a receiving-station and again picked up thereat, the transfer of the receptacles between the conveyer and the holders at the various stations being effected automatically by means of suitable stop and trip devices. These patents also disclose the idea of an elevator located at each salesman's station for supporting the receptacle, holder, or carrier and raising and lowering the same, the lowering being effected automatically by gravity when a receptacle has been deposited in the elevator from the conveyer, the latter in passing operating trip mechanism to release the elevator. I am also aware that some years prior to the issuance of the said Neer patents there was disclosed in Patent No. 338,663, dated March 23, 1886, and granted to G. F. Green, the general idea of a store-service apparatus in which a carriage is caused to traverse a track by electricity, the direction of the current being automatically reversed, so that the carriage reciprocates on the track, in contradistinction to its traveling round and round, as in the Neer apparatus, and a plurality of stations occur along the track, where receptacles are suspended when it is desired to have them picked up by the carriage, the latter being equipped for supporting and conveying any number of the receptacles to a receiving-station and there delivering the same, and also adapted to return the receptacles and deliver them at their respective stations after they have been replaced on the carriage at the receiving-station. In a still earlier patent, No. 338,224, dated March 16, 1886, and granted to said G. F. Green, there is disclosed the general idea of a car or carriage reciprocating by electricity upon a length of track at the ends of which there are automatic current-reversing devices to insure a continued travel of the car, which carries a receptacle for parcels and cash, with provision for lowering the same to remove the parcel and cash, or for other purposes, either at the different stations where the salesmen may be located or at the receiving-station. With full knowledge of this prior state of the art I have in evolving the present invention endeavored to utilize elements of the apparatus shown in these prior patents, while avoiding certain objectionable features, and to so combine the useful and essential elements with other elements as to produce a thoroughly practical result.

While it is true I employ a number of elements which may be considered the equivalent of corresponding elements used in the constructions which are disclosed in the patents hereinbefore referred to, yet my invention differs essentially from the disclosures in these prior patents in novel combinations of parts whereby defects discovered in apparatus constructed in accordance with said prior patents are entirely obviated.

The present invention particularly relates to the improvement in the electrical conducting system which provides for an economic use of electricity, so that all the work required can be expeditiously accomplished without appreciable waste of the current. This improved electrical conducting system also provides for more complete and perfect control of its workings than any apparatus of this kind heretofore known.

While certain of the general features of the present invention were, as above stated, disclosed in prior patents, yet the evolution of the present invention is believed to make possible for the first time the practical application of those general features in a great variety of industries, opening up much broader fields for the utilization of an automatic conveying system than could possibly have been contemplated by prior patentees. The form in which I have embodied the general features of a conveying system of the character shown in the prior patents mentioned will readily suggest their practical application in various other connections than for store-service—as, for example, in apparatus for conveying commodities from place to place in workshops and factories, in excavating and dredging operations, and in fact in any connection where a load is to be carried from place to place and deposited or discharged at a receiving-station. In the present application I have indicated only a limited number of modes in which the invention is capable of embodiment; but it will be understood that I do not propose to confine myself to a limited application of the invention, and therefore the appended claims, which recite what I consider its essential elements, are intended to cover the broad application of the invention in any connection where it is applicable.

The drawings which accompany and form part of this specification illustrate a number of forms of embodiment of the invention.

Of said drawings, Fig. 6 represents a perspective view of the fixture at one of the salesmen's stations and its appurtenances, together with the elevator in its raised position. Fig. 6$^a$ represents in side elevation certain cut-out devices located at the station. Fig. 6$^b$ represents a cushioning device for the elevators in side elevation.

Figures 6, 6A, 6B:
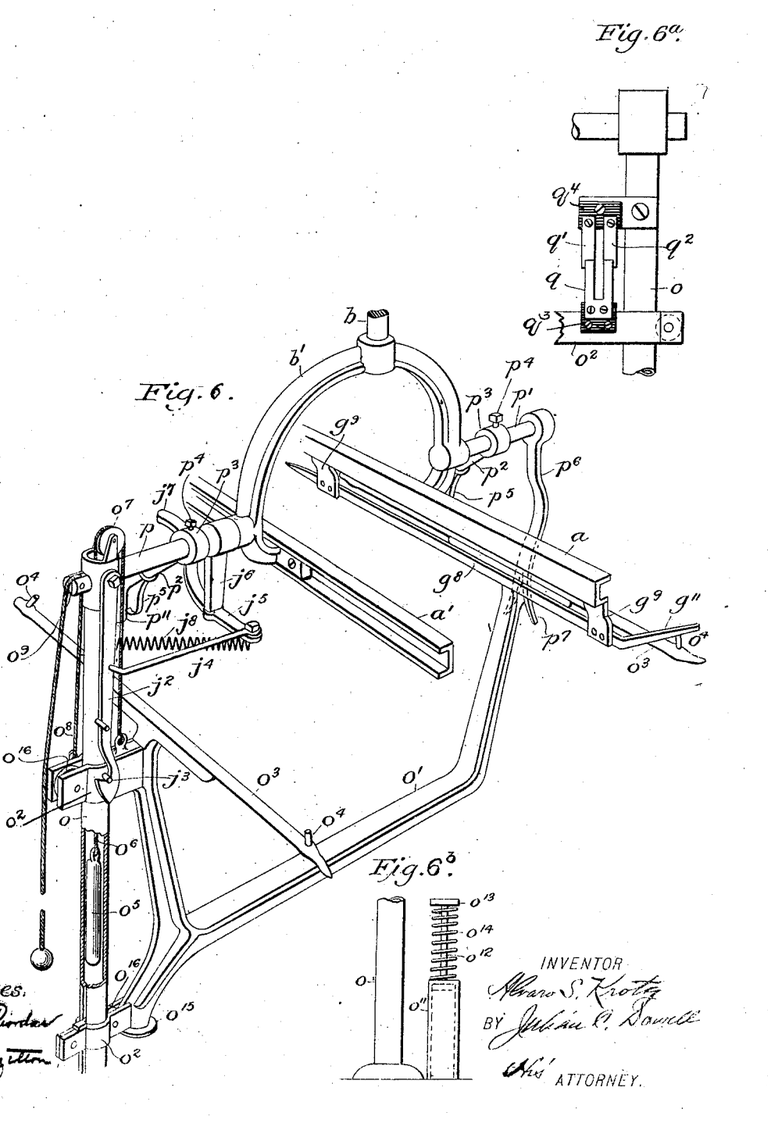
Figure 8:
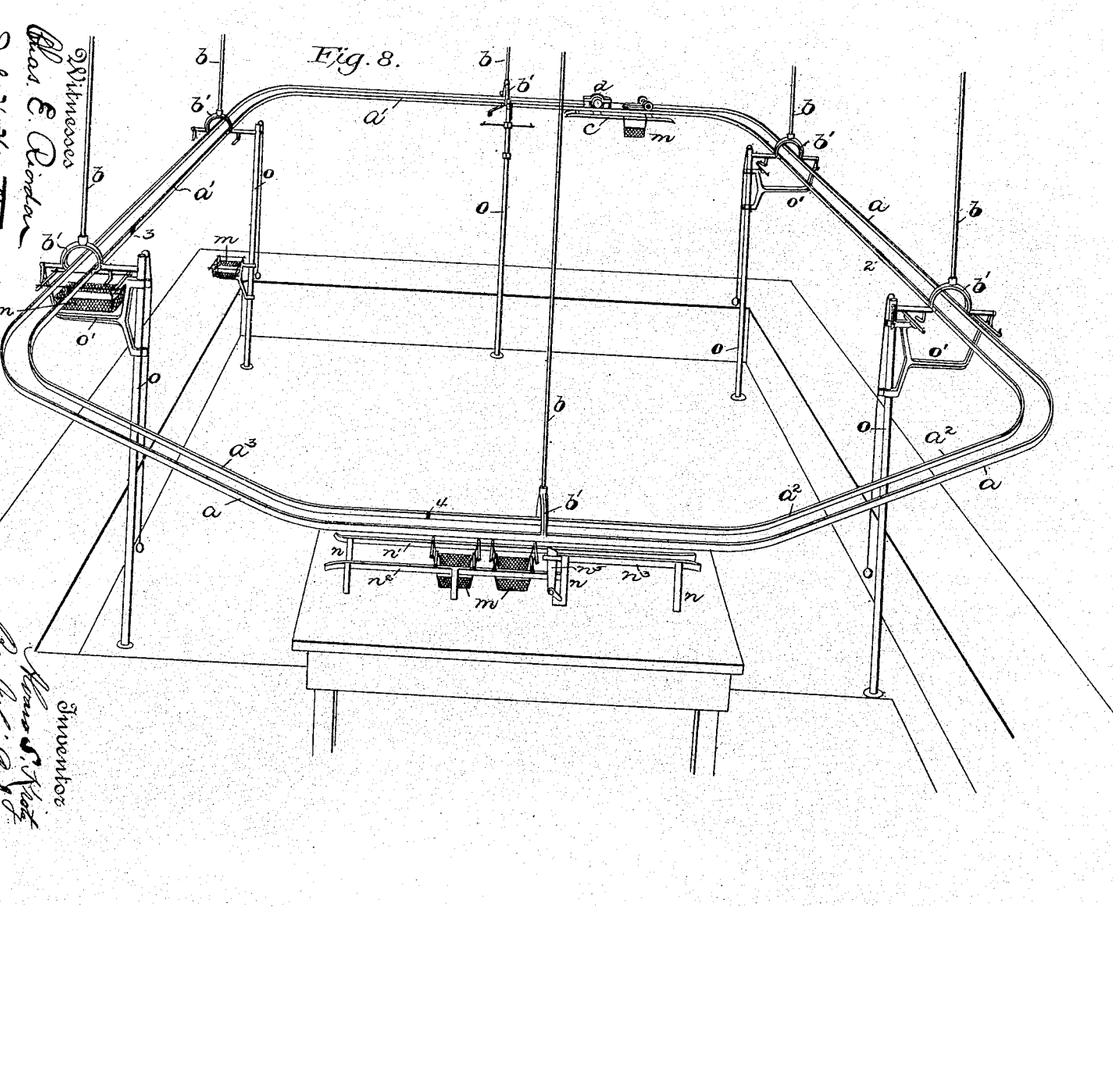
Fig. 8 represents a perspective view of a complete system.

The invention may be embodied in a system where the track is continuous, extending over the cashier's desk or over a suitable stand where wrapping is done or where change is made, the track thence extending on an incline at each side until the desired elevation is attained, and thence horizontally from the top of one inclined section to the top of the other. Such a system is illustrated in perspective in Fig. 8, and the letters $a$ and $a'$ designate, respectively, the outer and inner rails composing the main portion of the track, and the letters $a^2$ and $a^3$ designate sections of the inner rail in the inclined portions of the track, these sections being insulated from the main portion $a'$ of the inner rail and also from each other, as indicated at the points 2, 3, and 4 in Figs. 8 and 9. The purpose of this particular construction of the inner rail of the track will be more clearly set forth hereinafter in connection with the description of the electrical apparatus for operating the system; but it may be here remarked that the general purpose of this sectional construction is to provide for the application of more power when a load is being carried up an inclined portion of the track and to reduce the power when a load is traveling down an inclined portion of the track. The track is preferably composed of rails which are angular in cross-section, as shown in Fig. 6, said rails being supported in any suitable manner—as, for example, by hangers suspended from the ceiling of the room in which the apparatus is erected. In the drawings the letter $b$ designates the stem of such a hanger, and $b'$ a yoke secured to the lower end of the stem and to the track-rails, on the outer sides of the latter, with properly-interposed insulation.

Figures 1, 2:
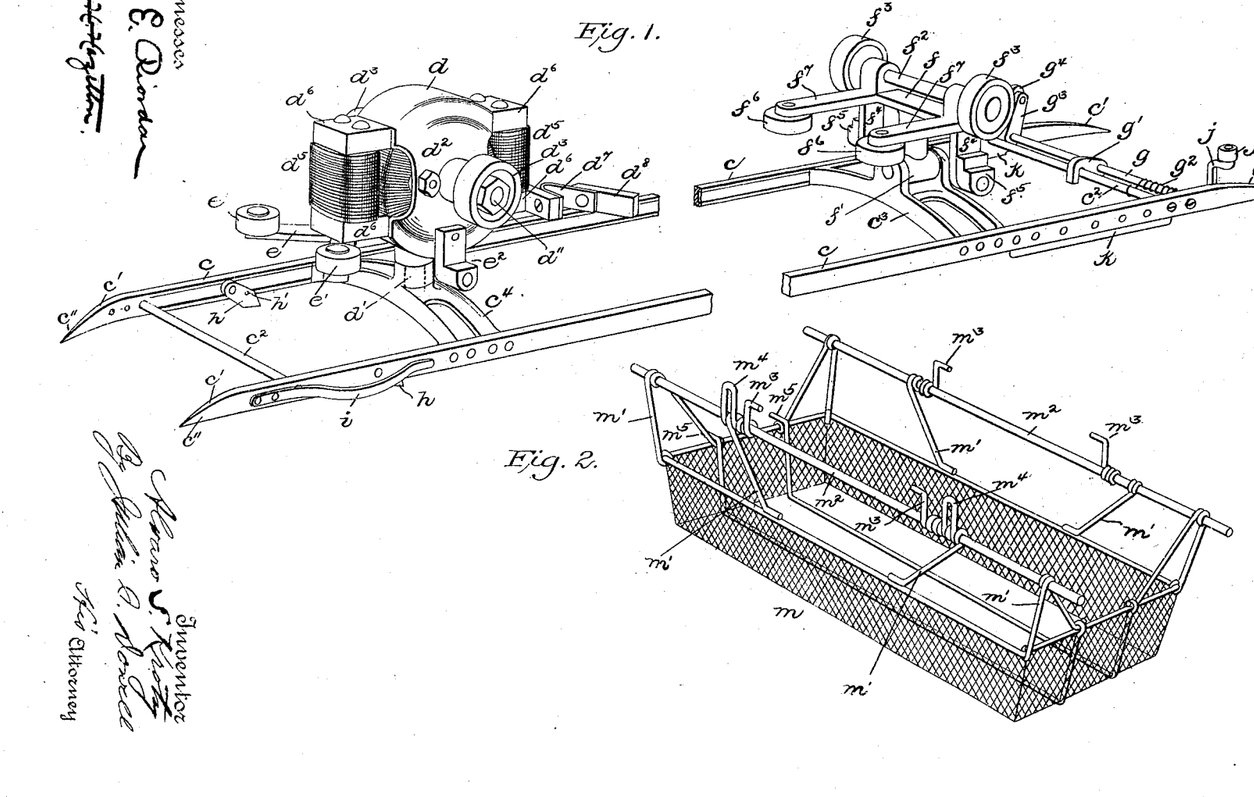
Figure 1 represents the conveyer in perspective and detached.
Fig. 2 represents one of the carriers or baskets in perspective and detached.

The carriage which travels upon the above-described track and is intended to remain constantly thereon is of the following description, reference being had more particularly to Fig. 1: It comprises a pair of rails $c$, each tapered at both ends on the upper sides, as shown at $c'$, and turned inwardly at one end, and tapered on the outer side also, as shown at $c''$. The said rails are connected near their ends by cross-rods $c^2$ and at intermediate points by arches $c^3$ and $c^4$, of skeleton construction, which constitute, respectively, the bases for a trailer and a motor-truck. The latter comprises a suitable frame $d$, having a pendent journal $d'$, engaging a vertical bearing upon the arch $c^4$, a shaft $d''$, journaled in suitable bearings on said frame and carrying within the latter an armature $d^2$, and outside the frame a pair of wheels $d^3$, which run upon the track, the said wheels being preferably rubber-coated and their body portions being composed of hard fibrous material. Field-coils $d^5$ are supported at opposite sides of the armature in arms $d^6$, projecting from the frame of the motor, and to one of said arms there is secured a cross-piece carrying curved spring-arms $d^7$, which support brushes $d^8$, the latter bearing against the inner surfaces of the track-rails. These brushes are suitably wired to the commutator, which is arranged at one side of the frame $d$, and the said commutator is suitably wired to the field-coils $d^5$. The brushes $d^8$ conduct the electric current from the track-rails, and thence the current passes through the motor in a well-known manner to drive the wheels $d^3$ and propel the carriage along the tracks in an obvious way. The lower forward arm $d^6$ of the motor-frame carries a bracket $e$, on the outer ends of the arms of which there are journaled a pair of rollers $e'$, which by contact with the inner surface of the track-rails properly guide the motor around the track, insulation being appropriately interposed to prevent these rollers acting as conductors of electricity to drive the motor. Further guiding means are provided in the form of blocks of insulation $e^2$, secured to the sides of the motor-frame and shouldered so as to extend over the inner sides of the track-rails and also underneath the same to prevent the motor from jumping the track.

The trailer hereinbefore referred to comprises a frame $f$, having a pendent journal which engages a bearing $f'$, which in turn is journaled in the frame $c^3$, the said journals being at right angles to each other, with the object of compensating for irregularities in the track without causing the rails of the carriage to be appreciably affected. The trailer-frame $f$ is formed with upright bearings for a shaft $f^2$, which carries wheels $f^3$ to run upon the track-rails, these wheels being of corresponding construction to the wheels of the motor. Arms $f^4$, which depend from the frame $f$ at opposite sides of the same, carry blocks of insulation $f^5$, shouldered to extend over the inner sides of the track-rails and also under the lower sides of the same to properly guide the trailer and also to prevent the same from jumping the track. Further guiding means are provided by rollers $f^6$, journaled at the outer ends and on the under sides of arms $f^7$, projecting from the front side of the frame $f$, the said rollers running along the inner sides of the track-rails.

It will be seen that a carriage constructed as above described is calculated to run easily around the track without any possibility of binding thereon at any point, notwithstanding the fact that slight irregularities may exist, and, moreover, ample provision is made for preventing any possibility of the carriage becoming derailed.

The other equipments of the carriage, which will next be described, have to do with its capability of handling the baskets or other carriers—that is to say, taking up the same at various points and dropping them again at the cashier's stand and also returning them to and depositing them at their own stations. A shaft $g$ is journaled in the carriage-rails $c$, at the rear end of the latter, said shaft having affixed to its middle portion a hook-shaped arm $g'$, which when the shaft is in its normal position bears against the rear cross-rod $c^2$, depending sufficiently below the same to act against a basket or carrier which may be resting upon the rails $c$. A spiral spring $g^2$ surrounds the said shaft and is secured at one end thereto, and at its opposite end is engaged with the cross-rod $c^2$, the said spring pressing the hook-shaped arm $g'$ downwardly against said cross-rod. An arm $g^3$, affixed to the said rock-shaft, projects upwardly therefrom and is equipped with a roller $g^4$, which by coaction with certain cam-strips, hereinafter described, one of which is located at the cashier's stand and others at the various stations, produces a sufficient elevation of the hook-shaped arm $g'$ to remove it from position for engagement with a carrier or basket to permit the latter leaving the carriage.

In front of the motor gravity stop-pieces $h$ are pivotally connected with the carriage-rails, on the inner sides of the same, these stop-pieces having pins $h'$, which project into the inside grooves of the rails, so as to limit downward movement of the stop-pieces, the latter being for the purpose of preventing a holder or basket from moving off of the front end of the carriage. At this part of the carriage there are also provided spring-strips $i$, which are secured to the outer sides of the carriage-rails and project therefrom for coaction with the baskets or carriers in a manner which will be hereinafter explained. At the rear end of the carriage an arm $j$ is rigidly fastened to one of the rails $c$ and projects upwardly therefrom, being equipped with a roller $j'$, which coacts with parts, hereinafter described, at the different stations in connection with the delivery of the baskets or carriers.

Figure 3:
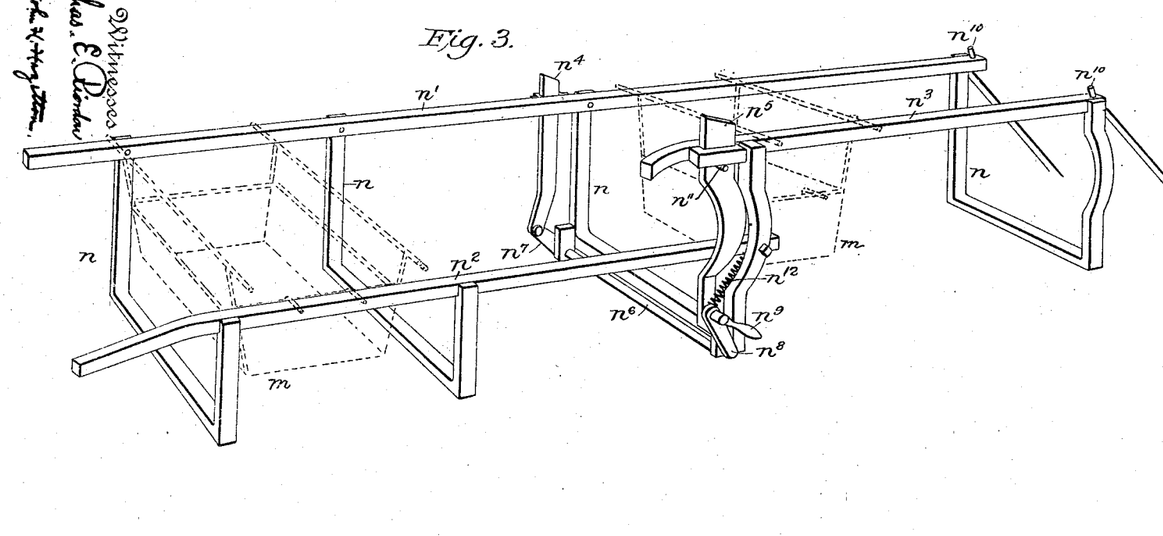
Fig. 3 represents the framework at the receiving-station in perspective.

On the inner sides of the rails $c$ of the carriage there are fastened strips $k$, which project somewhat below the lower edges of the rails and are composed of suitable material, such as rubber, which will cause sufficient friction between the carriage and baskets or carriers to insure the latter's being properly lodged upon the carriage and the swiftly-moving carriage properly picking up the baskets or carriers. One of these baskets or carriers is illustrated in perspective in Fig. 2 and comprises a body portion $m$ of any suitable form and construction, that here shown being composed of wire network and a suitable frame of metal rods, and suspension-rods $m'$, which rise from the frame of the body portion and have rigidly connected with them rods $m^2$, extending lengthwise of the basket, at an elevation above the body of the same, and projecting beyond the ends of the basket for the purpose of engagement with certain supports, hereinafter described, located at the various stations. On the rods $m^2$ there are rigidly fastened upstanding hooks $m^3$, whose horizontal arms project toward each other and are adapted to engage the upper sides of the rails $c$ of the carriage, whereby the basket or holder is suspended from and carried by the carriage. There are also rigidly affixed to one of the rods $m^2$ upstanding projections $m^4$, designed for coaction with certain abutments located at the particular station where the basket belongs, as will be more fully explained hereinafter. The basket is provided at one end with outwardly-projecting lugs or pins $m^5$ for engagement with a portion of the framework at the cashier's stand, which framework will next be described. It comprises a suitable number of U-shaped uprights $n$, (see Fig. 3,) a back rail $n'$ at a suitable elevation to properly receive the projecting ends of the rods $m^2$ of the baskets when the latter are brought to the cashier's stand by the carriage, a front rail $n^2$, considerably lower than the back rail $n'$, so as to permit the baskets being taken out and replaced readily, said front rail providing a resting-place for the pins or lugs $m^5$ on the baskets, and a supplemental front rail $n^3$ at the same height as the back rail $n'$ and affording a support for the projecting ends of the rods $m^2$ of the baskets when the latter are put in position to be taken by the carriage and conveyed away from the cashier's stand. At about the middle of the framework on the cashier's stand—that is to say, where the upper and lower front rails $n^3$ and $n^2$ overlap, as shown in the drawings—there is arranged a stop mechanism for effecting the delivery of the baskets when brought to the cashier's stand from the various stations. This stop mechanism comprises the following parts: In suitable guides on the outer sides of the back rail $n'$ and the front rails $n^3$ there are arranged to slide vertically a pair of strips $n^4$ and $n^5$, which normally project above the said rails in the path of the projecting ends of the basket-rods $m^2$, so that the latter will encounter said stop-pieces and be prevented thereby from being carried on by the carriage. Said strips or stop-pieces are connected with a rock-shaft $n^6$ by means of arms $n^7$ and $n^8$, affixed to said rock-shaft and pivotally connected with the strips, respectively. Said arm $n^8$ is equipped with a suitable handle $n^9$ and is connected by a spiral spring $n^{12}$ with one of the uprights of the framework. This spring holds the stop-pieces or strips normally projected above the rails $n'$ and $n^3$; but by means of the handle $n^9$ the stop-pieces or strips may be lowered to permit passage of the basket beyond the same, so as to rest upon the rails $n'$ and $n^3$ in position to be taken by the carriage.

Figure 4:
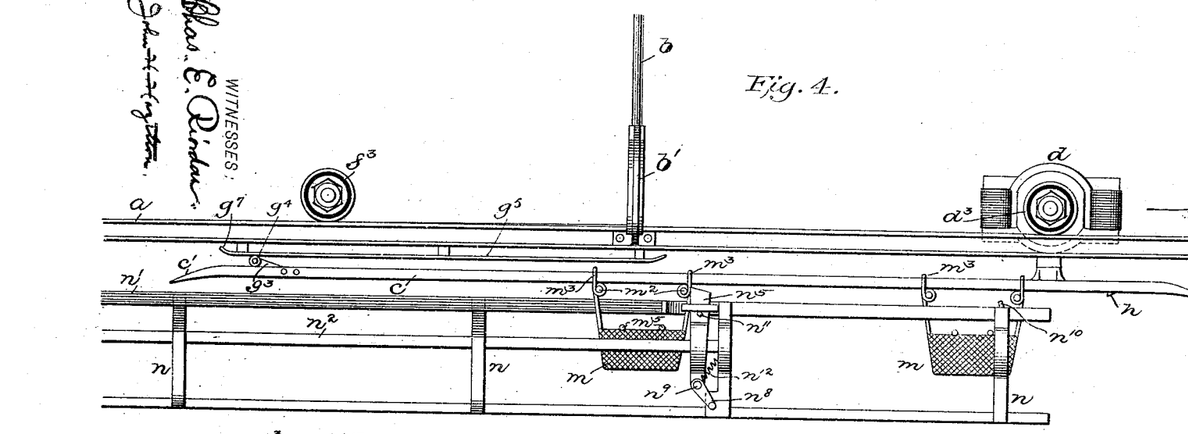
Fig. 4 represents an elevation of this framework, together with a portion of the track and the conveyer as it appears in passing through the receiving-station.
Figure 5:
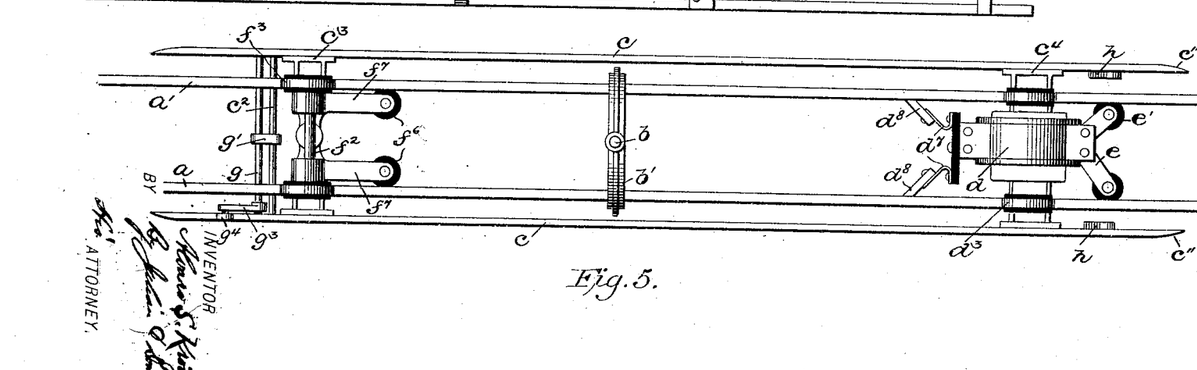
Fig. 5 represents a plan view of the same.

When a basket is brought into the receiving-station, its front rod $m^2$ abuts the strips $n^4$ and $n^5$, as shown in Fig. 4, and the carriage passes on through, the basket dropping upon the rails $n'$ and $n^2$ when disengaged from the carriage. In order to have the basket taken away by the carriage, the stop-pieces $n^4$ and $n^5$ are lowered and the basket is pushed along beyond the same, where it can be picked up, as also shown in Fig. 4, and conveyed away.

Of course when one or more baskets have already been deposited in the receiving-station the next basket brought in will not come against the strips $n^4$ and $n^5$, but against the basket in front of it. The upward movement of the strips is limited by a projection $n''$ on one of them coming against the under side of the guide on the rail $n^3$.

Extending along just under the outside track-rail $a$, where the latter runs above the cashier's stand, there is a strip $g^5$, secured to the said track-rail by means of suitable brackets and positioned to coact with the roller $g^4$, hereinbefore described as part of the carriage equipment. The said strip $g^5$ has an upturned end portion $g^7$, and when the carriage runs into the framework on the cashier's stand the roller $g^4$ by coaction with the said upturned end of the strip $g^5$ causes a rocking of the shaft $g$ sufficient to elevate the hook $g'$ above the plane of the basket-rods $m^2$, so that the carriage can pass on through the framework on the cashier's stand, while the baskets are left in the latter by reason of their abutment against the stops $n^4$ and $n^5$. The strip $g^5$ is of sufficient length to hold the hook $g'$ elevated long enough to insure the complete disengagement of the carriage from the baskets or holders.

At each of the stations where the baskets are picked up by the carriage there is erected a tubular standard $o$, (see Fig. 6,) which projects above the track and constitutes a guide for a vertically-movable basket holder or elevator, comprising a U-shaped frame $o'$, having suitable clips $o^2$ loosely embracing the said standard, and longitudinal rods $o^3$, fixedly mounted upon the uprights of the U-shaped frame and constituting supports for the basket, the projecting end portions of whose rods $m^2$ are adapted to rest upon the said rods $o^3$ and the latter being provided with upstanding pins $o^4$ near their ends to prevent the accidental removal of the basket. The basket holder or elevator is counterbalanced by a weight $o^5$, suspended within the tubular standard by means of a cord $o^6$, which runs over a pulley $o^7$, mounted in bearings on the upper end of the standard, the said cord depending on the outer side of the standard and suitably connected with the elevator. Suitable means are provided for raising the elevator, those here shown comprising a cord $o^8$, attached at one end to one of the clips $o^2$ and passing upwardly and over a pulley $o^9$ on the standard, at the upper part of the same, the said cord depending a suitable distance for manipulation and being equipped with a suitable handle, knob, or button.

The weight $o^5$ exactly counterbalances the elevator, so that the latter will remain in any position to which it is brought; but when a basket or holder is deposited in the elevator the counterbalancing-weight is overcome, so that the elevator lowers, and to prevent shock in the lowering of the elevator with the basket any suitable cushioning means may be provided. That here shown comprises a cylinder $o''$, a piston-rod $o^{12}$, having a piston on one end closely fitting the interior of the cylinder and a head $o^{13}$ on the upper end, and a spiral spring $o^{14}$, surrounding the piston-rod and bearing at one end against the cylinder and at the other against the head $o^{13}$. When the elevator lowers, a flattened projection or foot $o^{15}$, formed upon the frame $o'$, encounters the head $o^{13}$ and a cushioning effect is produced in an obvious manner.

To secure easy running of the elevator up and down the standard, rollers $o^{16}$ are journaled in the clips $o^2$ and have concaved peripheries to engage the surface of the standard, on opposite sides of the same. Suitable means are also provided, such as a slot in the standard and a projection on one of the elevator-clips, to prevent turning of the elevator.

The standard $o$ is fixedly connected at its upper end with one of the hangers $b'$ by means of a rod or shaft $p$, and a corresponding shaft $p'$ projects from the opposite side of the said hanger, and these shafts constitute supports for adjustable stop devices in the form of arms $p^2$, having bosses $p^3$, which embrace the rods and are adjustably secured to the same by means of set-screws $p^4$. The arms $p^2$ project forward and downwardly from the shafts or rods and at their ends have downturned portions $p''$, against which the projections $m^4$ on the basket abut when the latter is delivered by the carriage. To prevent a rebound of the basket or carrier when such abutment takes place, guard-springs $p^5$ are fastened to the under sides of the arms $p^2$, said springs being curved in a manner to permit of their ready displacement by the basket projections, but turned upwardly at their ends, so as to extend substantially parallel with the downturned end portions of the arms $p^2$ and hence prevent a rebound of the basket after striking the downturned ends $p''$. The stop-arms $p^2$ are adjusted differently at the different stations, so that they will stand in the path of the projections on that basket which belongs at the station where these stop-arms are located. The rod or shaft $p'$ carries at its outer end a pendent arm $p^6$, having a bifurcated lower end $p^7$, constituting a guide for the elevator, which is suitably formed at its outer side for engagement with the bifurcation of said pendent arm. A strip $g^8$ extends along below the outer track-rail $a$ and on either side of the hanger $b'$, said strip being supported by brackets $g^9$, fastened to the said track-rail, and being formed at one end with an upturned or inclined portion $g''$, positioned for coaction with the roller $g^4$ on the carriage for a similar purpose to that hereinbefore described in connection with the delivery of the baskets at the cashier's stand—namely, to elevate the hook $g'$, so that it will clear the basket when the same is to be delivered at the station.

When the elevator, with its basket, is raised to bring the basket in position to be taken by the carriage, it is held in that position by means of a hook $j^2$, pivotally connected at its upper end with the standard $o$ and depending for engagement with a pin $j^3$ on one of the clips of the elevator-frame, the said hook being inclined on its under edge and spring-actuated for the purpose of automatic engagement with the pin. The said pendent hook is connected by a link $j^4$ with one end of a horizontally-disposed lever $j^5$, which is pivoted to an arm $j^6$, depending from and fixedly attached to the shaft or rod $p$, and said lever on the front side of its pivot is curved inwardly, as shown at $j^7$, so as to extend in the path of the roller $j'$ on the carriage, whereby the hook $j$ may be displaced as the carriage passes and the automatic lowering of the elevator, with its basket, thereby effected. A spiral spring $j^8$, which is connected at one end with the standard $o$ and at the other end with the lever $j^5$, exerts itself to restore the parts to their normal positions, as illustrated in Fig. 6.

Figure 7:
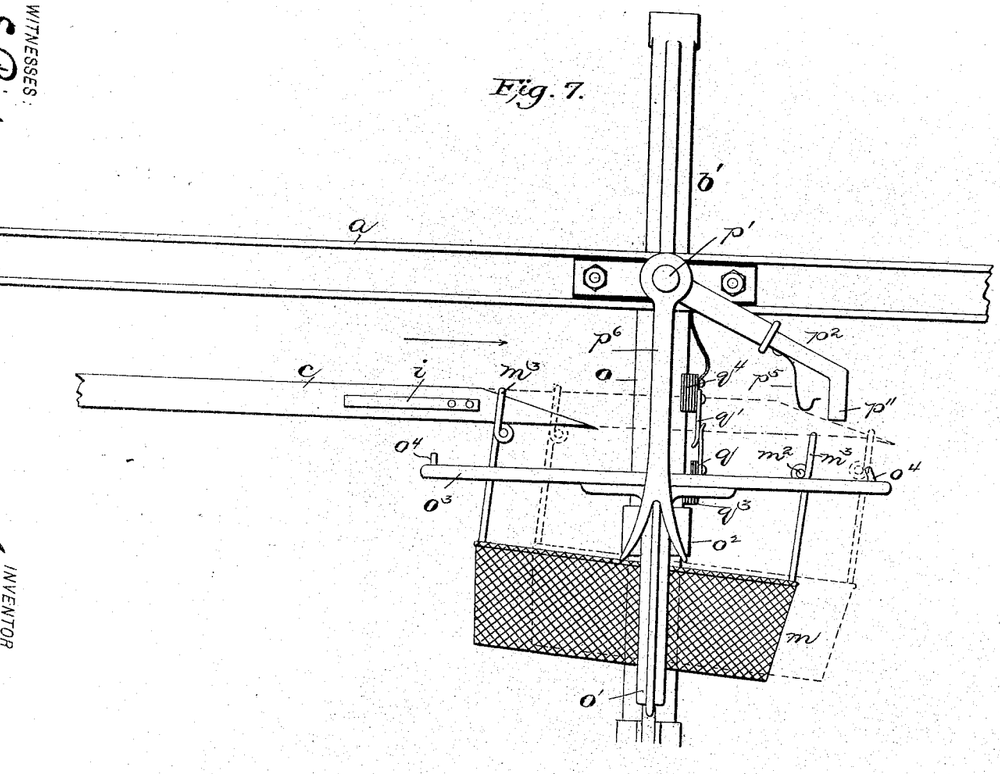
Fig. 7 represents a side elevation of the same parts as appear in Fig. 6, together with part of the conveyer and one of the baskets, illustrating the manner in which the latter is picked up by the conveyer.

In the operation of the system the carriage traveling around on the track will pick up any one of the baskets or holders which may have been raised at any one of the stations. When so raised, the basket assumes a position with its upstanding hooks $m^3$ so located that the rails $c$ of the carriage will pass through said hooks; but the horizontal arms of said hooks are not in as high a plane as the upper sides of the carriage-rails, and the basket is elevated by the action of the inclined upper sides $c'$ of the carriage-rails acting against the under sides of the horizontal arms of the hooks, as shown in Fig. 7. The basket is not raised far enough by the elevator to bring its projections $m^4$ into line with the stops $p''$, and it is evident that before the basket is raised by the carriage the said stops $m^4$ must be beyond the stops $p''$. Otherwise the basket could not be carried on by the carriage. Sufficient friction may be engendered between the carriage-rails and the hooks on the basket which are first encountered to move the latter forward far enough to carry its projections $m^4$ beyond the stops $p''$; but to insure this result the springs $i$ are provided on the sides of the carriage-rails for pressure against the upright portions of the hooks $m^3$ first encountered, so that the basket will not only be tipped up at its rear side, but will be carried forward before it is bodily elevated. Of course the basket may be in such a position on the elevator that this last-described operation is not necessary; but, again, it is liable to rest upon the rods $o^3$ of the elevator in such a position that the projections $m^4$ on the carriage will come behind the stops $p''$, and hence the provisions above described for insuring conveying away of the basket by the carriage.

It will be understood that as the carriage comes into the station the roller $g^4$ on the carriage encounters the inclined end of the strip $g^8$, and it is thereby depressed, so that the hook $g'$ will be elevated and can pass over a basket which is to be delivered at the station. A basket which is not to be delivered at the station will be carried on through, as it will encounter no stops at the station. As the carriage leaves the station its roller $j'$ acts against the curved portion $j^7$ of the lever $j^5$, and through the connections hereinbefore described the hook $j^2$ is tripped, so that a basket delivered at the station will be immediately lowered to its normal position.

When a basket has been taken from one of the stations in the manner above described, it is conveyed to the cashier's stand, where the carriage runs into the framework and carries the basket against the stops $n^4$ and $n^5$ and passes on, leaving the basket in the frame. When the basket is to be carried from the cashier's stand back to its station, stops $n^4$ and $n^5$ are lowered by means of the handle $n^9$, and the basket is moved beyond the said stops, which are again projected above the rails $n'$ and $n^3$. When the carriage comes around again, it will take up the basket thus moved beyond the stops $n^4$ and $n^5$ in the same manner as it picked up the basket at the station, and it will then carry the basket to its own station and there deposit it. Suitable stoppins $n^{10}$ project from the rails $n'$ and $n^3$ to prevent the basket from being carried off the same without having been properly engaged with the carriage.

Each elevator carries a circuit-closer in the form of a metal piece $q$ with contact-fingers for engagement with contact-fingers $q'$ and $q^2$, connected with separate electrical conductors, as hereinafter more fully described, the said metal piece $q$ and contact-fingers $q'$ and $q^2$ being fastened to blocks of insulation $q^3$ and $q^4$, secured to the elevator and the standard, respectively, and the arrangement being such that when the elevator is raised a circuit is closed through the motor on the carriage.

It will be seen that the operation of such a system as above described proceeds automatically so far as the transferring of the baskets between the carriage and the holders at the various stations and the propulsion of the carriage is concerned, it being only necessary for the operators to put the baskets in positions to be taken up by the carriage in passing, and even this can be effected automatically, if desirable, as hereinafter explained. It is to be noted that the transfer devices are constructed and arranged with a view to certainty of operation and durability. It may be here stated that wherever there is a direct impact abutting parts will be faced with wearproof and sound-deadening material.

Possibility of derangement of the system is very slight, for the manipulations which attendants are called upon to perform are of the simplest nature, and mistakes calculated to cause accidents to the system are hardly possible.

Figure 9:
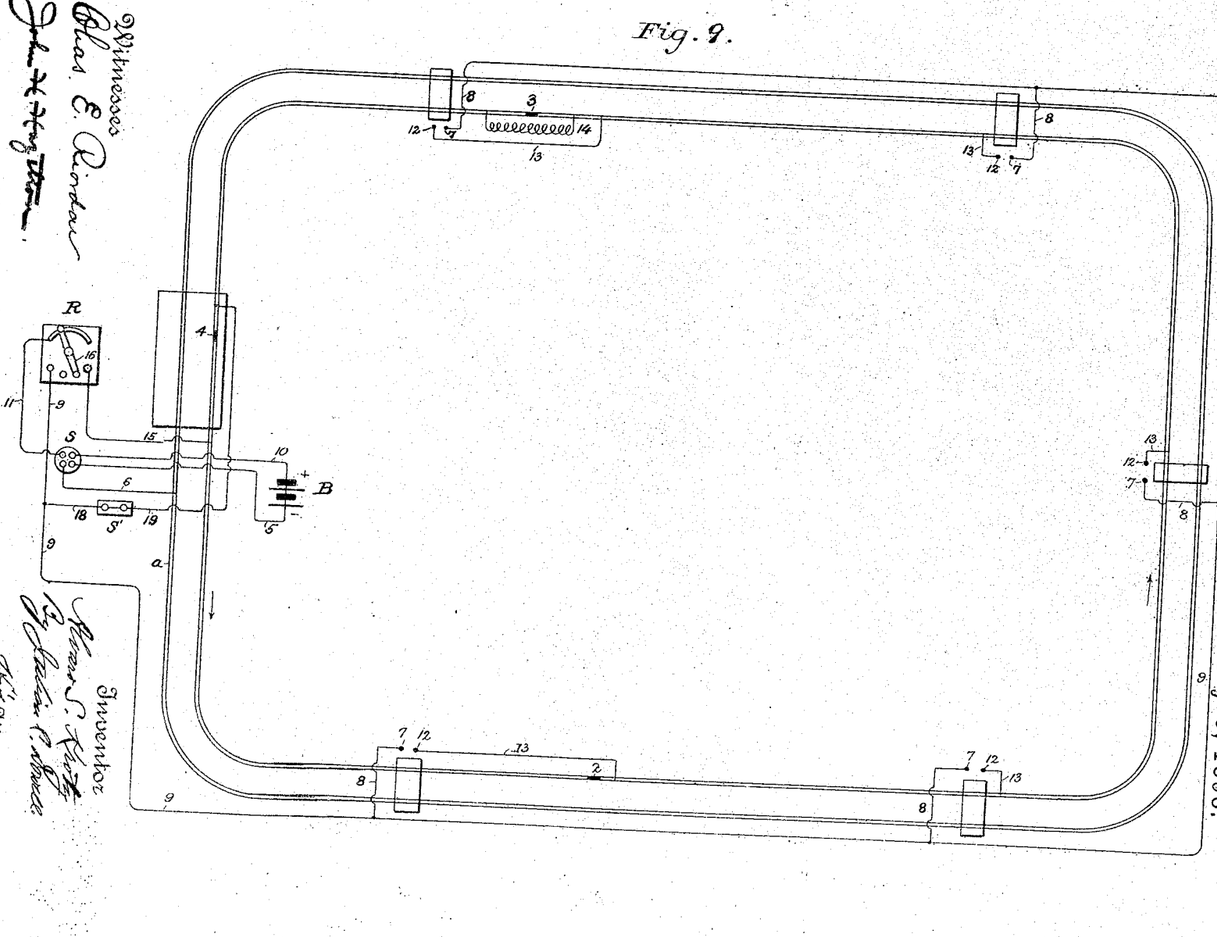
Fig. 9 represents the system of electrical connections in diagram.

Fig. 9 shows a diagram of the electrical connections for controlling and operating the above-described parcel and cash carrier system. The battery or other source of electrical supply is indicated conventionally at B, a rheostat at R, and switches or cut-outs at S and S', these last three devices being in practice located at the receiving-station or the cashier's desk or stand. An electrical conductor (designated by the numeral 5) connects the negative pole of the battery with one terminal of the switch S and another conductor 6 connects the companion terminal of said switch with the outside track-rail $a$, which, it will be remembered, is a continuous conductor, and through these connections, therefore, the motor is always in electrical connection with one pole of the battery when the main switch S is closed. At each of the various stations located around the track there is a terminal 7, which is connected by a branch 8 with a conductor 9, which is connected with one of the end contact-points of the rheostat R. A conductor 10 connects the positive pole of the battery B with a terminal of the switch S, and the companion terminal in said switch is connected by a conductor 11 with the arc-shaped contact-bar of the rheostat. At each one of the stations there is a terminal 12, connected by a conductor 13 with the inside track-rail, and it will be seen that whenever the terminals 7 and 12 are connected a circuit is established through the motor, provided, of course, that the switch S is closed. As hereinbefore described, the inside track-rail $a'$ is made in sections insulated from each other at the points 2, 3, and 4. The section of track between points 3 and 4 is inclined and the motor travels down the same, so that it is desirable to cause the current to pass through a resistance-coil before entering this section of the track, and in the diagram the resistance-coil is shown at 14 connecting the insulated section with the main section of the inside track. The other insulated section of the track between points 2 and 4 also has an inclined portion, but the motor travels up this inclination, and therefore it is desirable to increase the strength of current through the motor at this point, where more work is done than when the car is running on the level or down the other incline, and therefore this insulated section of the track is connected by a conductor 15 with the end contact-point of the rheostat opposite that with which the conductor 9 is connected. It will be seen that by properly adjusting the rheostat arm or finger 16 an increase in the strength of current through the motor will result while the car is running over this upward-inclined insulated section of the inside track-rail—that is to say, the arm or finger of the rheostat can be so adjusted that the current encounters less resistance in the rheostat when the motor is running up the inclined portion of the track than when it is running over the level portion of the track or down an inclined portion thereof.

The object of the switch S' is to provide for the closing of the circuit independent of the circuit-closers at the various stations, and to this end a branch 18 of the conductor 9 connects with a terminal in the switch S' and the companion terminal in said switch is connected by the conductor 19 with the inside track-rail. It will thus be seen that when the switches S and S' are closed the circuit is complete without any connection between terminals 7 and 12 at any one of the stations. These station-terminals correspond with the contact-fingers $q'$ and $q^2$, hereinbefore described as attached to the standard $o$ at each of the various stations and adapted to be connected by the metal piece $q$ on the elevator, and it will be clear from the diagram above described that whenever such connection is made the circuit is closed, provided, of course, that the main switch S is closed.

By means of the rheostat it is evident that resistances in the circuits embracing different sections of the track can be regulated so as to proportion the strength of the current to the condition of the track at different points.

A circuit having been closed by the raising of one of the elevators at a station remains closed, so far as the switch at that station is concerned, until the basket has been redelivered at the station. This having taken place, the circuit is broken and the carriage comes to a standstill unless another elevator has in the meantime been elevated or unless the switch has been closed. It will be seen that this latter switch provides a means whereby an operator at the receiving-station can put the carriage in motion wherever it may be and whatever may be the condition at the various out-stations. It will of course be understood that the switch S cuts out the whole system, and without this switch being closed the connection of terminals at the various places described is ineffectual to start the carriage.

It is evident that the receptacles, instead of being carried to and delivered at a common receiving-station, as in the previously-described forms of apparatus, may be delivered at corresponding stations to their own and simply transferred between two or more corresponding stations. Such an apparatus would be adapted for use in establishments where goods or commodities are carried from one room to another or from one part of the building to another for any purpose. The track arrangement in such system may be such as to provide for either round-and-round traverse of the car or a reciprocal traverse thereof. It will be readily understood that the appliances hereinbefore described in detail in connection with the parcel-carrier system are equally applicable in such a system as now indicated.

The above-described modifications are only a few of those which might be resorted to in carrying out the invention here disclosed. It is evident that elevating-motors might be employed at the different stations something after the manner explained in the patent to Neer, No. 578,939, hereinbefore referred to—that is to say, the carriage in approaching a station might be arranged to close a circuit through a motor suitably connected with the elevator, so as to lift the same to its uppermost position, the circuit through this elevating-motor being automatically interrupted when the elevator has been caught by the hook which sustains it in its uppermost position. I may also arrange a circuit-closer to be operated by the load when placed into the elevator, so that only where there is a load in the carriage will this branch circuit be closed. It will also be apparent that where loads of great weight are to be picked up by the carriage resistances can be introduced in the electrical connections in such a manner as to cause the carriage to slack up when approaching and leaving a station. It is further apparent that while I have shown in the drawings a single carriage running upon the track it is entirely feasible to employ a number of carriages and that in such an event the track could be so constructed and the electrical connections be so arranged as to establish a block system to prevent collision between the carriages.

It is proposed in erecting a parcel-carrier and cash-carrier system in accordance with my invention to utilize an electric current which may be supplied to a building for lighting purposes, and if by reason of insurance regulations exposure of a conductor carrying full strength of the light-current is prohibited a suitable transformer or other device can be introduced to reduce the strength of the current, so as to come within any such prohibitory regulations, and in this connection it may be stated that it is entirely feasible to operate a cash or parcel carrier system in accordance with my invention by the use of a current of electricity of such moderate voltage as to remove all danger from exposed conductors.

While I have shown in the drawings a track composed of two rails, it is evident that numerous modifications in this respect may be resorted to, for the carriage or carriages might be run upon a track composed of wire stretched between suitable points, as in many cash-carrier and other systems now in use, and one or more stretches of such wire or cable or other form of track may be used in carrying out my invention, it not being essential that the car shall run upon two cables or rails.

It may be added that while I have here shown and described the track-rails as constituting conductors of electricity yet it is evident that the brushes on the carriage may run in contact with conductors independent of the track. Therefore the term "track-conductor" employed in the claims means either a track-rail or a conductor running along the track and not necessarily constituting a way for the wheels of the motor to run upon.

In the following claims the essential features of the invention are recited, and these claims are intended to embrace the embodiment of the invention in any kind of a conveying system where it is applicable.

In a companion application filed February 5, 1898, Serial No. 669,231, which is a division of the present case, the matter disclosed herein and not pertaining to electrical features of the invention is claimed.

Having thus fully described my invention, what I claim as new, and desire to secure by Letters Patent of the United States, is—

1. In an electric conveying system, the combination of a battery or other source of electrical supply, track conductors, one connected with one pole of the latter, a plurality of terminals stationed along a continuous stretch of the other track conductor and all connected with the other pole of the battery, and automatically-opening circuit-closers to connect said terminals respectively with said latter track conductor.

2. In an electric conveying system, the combination of a battery or other source of electrical supply, track conductors, one connected with one pole of the latter, a plurality of terminals stationed along a continuous stretch of the other track conductor and all connected with the other pole of the battery, circuit-closers to connect said terminals respectively with said latter track conductor, and means for effecting automatic displacement of said circuit-closers by the traverse of the motor-vehicle along the track.

3. In an electric conveying system, the combination of a battery or other source of electrical supply, track conductors, one connected with one pole of the latter, a plurality of terminals stationed along a continuous stretch of the other track conductor and all connected with the other pole of the battery, automatically-opening circuit-closers to connect said terminals respectively with said latter track conductor, and an additional connection between the same and the battery having a manually-controlled switch, substantially as and for the purpose described.

4. In an electric conveying system, the combination of a battery or other source of electrical supply, track conductors, one connected with one pole of the latter, a plurality of terminals stationed along a continuous stretch of the other track conductor and all connected with the other pole of the battery, circuit-closers to connect said terminals respectively with said latter track conductor, means for effecting automatic displacement of said circuit-closers by the traverse of the motor-vehicle along the track, and an additional connection between the same and the battery having a manually-controlled switch, substantially as and for the purpose described.

5. In an electric conveying system, the combination of a continuous track conductor, a sectional track conductor, a rheostat whose end contact-points are independently connected with sections of the sectional track conductor, a battery or other source of electrical supply, and connections between the poles of the latter and the rheostat and continuous track conductor respectively.

6. In an electrical conveying system, the combination of a track composed of a rail or member which is a continuous conductor of electricity, and a rail which is in sections insulated from each other, a battery or other source of supply of electricity, an electrical connection between one pole of said battery and the continuous rail, with an interposed switch, a rheostat, an electrical connection between the other pole of the battery and the movable member of the rheostat, separate electrical connections between the end contact-points of the latter and the sections of the sectional rail, one or more cut-outs at one or more stations along the track, and a conveying-motor traveling in electrical contact with both track-rails.

7. In an electrical conveying system, the combination of a track composed of a rail or member which is a continuous conductor of electricity, and a rail which is in sections insulated from each other, a battery or other source of supply of electricity, an electrical connection between one pole of said battery and the continuous rail, with an interposed switch, a rheostat, an electrical connection between the other pole of the battery and the rheostat, separate electrical connections between the latter and the sections of the sectional rail, one or more cut-outs at one or more stations along the track, an electrical connection between the rheostat and the sectional rail independent of said cut-outs and itself having a cut-out, and a conveying-motor traveling in electrical contact with the track-rails.

8. In an electrical conveying system, the combination of an elevated track conductor of electricity, a conveying-motor running in electrical contact therewith, an electric circuit embracing the track conductor and motor, one or more elevators stationed along the track and having means for closing said circuit, and one or more carriers for transfer between the elevator and the motor.

9. In an electrical conveying system, the combination of a track composed of a rail or member which is a continuous conductor of electricity, and a rail which is in sections insulated from each other, a battery or other source of supply of electricity, an electrical connection between one pole of said battery and the continuous rail, with an interposed switch, a rheostat, an electrical connection between the other pole of the battery and the rheostat, separate electrical connections between the end contact-points of the latter and the sections of the sectional rail, including terminals at stations along the track, one or more elevators having circuit-closers to make contact with said terminals, and a conveying-motor running on the track in electrical contact therewith.

10. In an electrical conveying system, the combination with a track or way, a traveling motor thereon and an electric circuit embracing the same; of an elevator having means for closing said circuit, and a carrier adapted to lodge in said elevator, or on said motor, the motor and carrier having provisions for engagement whereby the latter may be sustained and conveyed by the former, and suitable stop and trip devices being provided whereby the carrier may be automatically transferred between the motor and elevator.

11. In an electrical conveying system, the combination with a track or way, a traveling motor thereon, and an electric circuit embracing the same; of an elevator having means for closing said circuit, and a carrier adapted to lodge in said elevator, or on said motor, the motor and carrier having provisions for engagement whereby the latter may be sustained and conveyed by the former, and suitable stop and trip devices being provided whereby the carrier may be automatically transferred between the motor and elevator, and also lodged at a receiving-station having stop and trip devices.

12. In an electrical conveying system, the combination with a track conductor, a conveying-motor in electrical contact therewith, and an electric circuit embracing the track conductor and motor and having terminals at one or more stations along the track; of one or more elevators at such stations and carrying circuit-closers for contact with the said terminals when the elevator is raised, and one or more carriers adapted to be automatically transferred between the conveying-motor and the elevator or elevators, suitable stop and trip devices being provided for this purpose.

13. In an electric conveying system, the combination of a normally open track-circuit having terminals in one or more pairs, one or more elevators having circuit-closers to contact with the said terminals, detent mechanism to sustain the elevator in circuit-closing position, a track, a motor-vehicle thereon having means for tripping said detent mechanism, and a holder for transfer between the vehicle and the elevator.

In testimony whereof I affix my signature in presence of two witnesses.

ALVARO SILAS KROTZ.

Witnesses:
J. A. TODD,
JOSEPH P. CARTMELL.